(12) United States Patent
Yamachika et al.

(10) Patent No.: US 7,922,505 B2
(45) Date of Patent: Apr. 12, 2011

(54) CARD CONNECTOR

(75) Inventors: Naoki Yamachika, Yao (JP); Kazuumi Otani, Kyoto (JP)

(73) Assignees: Hosiden Corporation, Osaka (JP); Nintendo Co., Ltd., Kyoto (JP)

( * ) Notice: Subject to any disclaimer, the term of this patent is extended or adjusted under 35 U.S.C. 154(b) by 0 days.

(21) Appl. No.: 12/795,979

(22) Filed: Jun. 8, 2010

(65) Prior Publication Data

US 2010/0317211 A1 Dec. 16, 2010

(30) Foreign Application Priority Data

Jun. 10, 2009 (JP) ................................. 2009-139204

(51) Int. Cl.
*H01R 13/62* (2006.01)
(52) U.S. Cl. ....................................................... 439/159
(58) Field of Classification Search .................. 439/159, 439/157, 59, 629
See application file for complete search history.

(56) References Cited

U.S. PATENT DOCUMENTS

| | | | | |
|---|---|---|---|---|
| 6,390,836 | B1 * | 5/2002 | Motegi et al. | 439/159 |
| 6,572,392 | B2 * | 6/2003 | Motojima | 439/159 |
| 6,890,198 | B2 * | 5/2005 | Kawahata et al. | 439/188 |
| 2002/0192991 | A1 * | 12/2002 | Motojima | 439/157 |
| 2004/0209506 | A1 * | 10/2004 | Kawahata et al. | 439/188 |
| 2009/0298321 | A1 * | 12/2009 | Sakiyama et al. | 439/377 |
| 2010/0009562 | A1 * | 1/2010 | Hirayama | 439/159 |

FOREIGN PATENT DOCUMENTS

JP 200884623 4/2008

* cited by examiner

*Primary Examiner* — Neil Abrams
*Assistant Examiner* — Phuongchi T Nguyen
(74) *Attorney, Agent, or Firm* — The Webb Law Firm (57) ABSTRACT

A card connector 1 includes a slide member 21 movable along an inserting/withdrawing direction of a card, an urging member 22 for urging the slide member 21 toward a card insertion opening, and a pin member 26 having a slide end 26a slidable within and relative to a cam groove 25 provided in the slide member 21 and a support shaft end 26b supported to the body 2 side. As the slide end 26a is retained at a lock portion L formed in the cam groove 25, the card is retained at an appropriate position. The card connector 1 includes a switch mechanism M which is operated by the support shaft end 26b when the slide end 26a is pushed by the slide member 21 along the urging direction of the urging member 22 at the time of retention of the slide end 26a at the lock portion L.

4 Claims, 6 Drawing Sheets

CARD CONNECTOR

TECHNICAL FIELD

The present invention relates to a card connector, more particularly, to a push-push type card connector whose switch mechanism is activated in response to attachment of a card at an appropriate position.

BACKGROUND ART

As an example of conventional card connectors, there is known a connector utilizing a so-called push-push mechanism. From Patent Document 1 for example, there is known a card connector including a slide member disposed inside a body of the card connector, an urging member for urging the slide member, a heart-shaped cam groove formed in the slide member, a pin member (cam pin) engageable in the cam groove, etc.

With the card connector described above, when the card is pushed to the deepest (innermost) portion within the body and then released from the pushing force, the pin member is retained at a predetermined position in the cam groove, whereby the card is maintained at its appropriate position inside the body. Then, if the card is pushed in again from the above condition, the retained condition of the card is released. And, upon subsequent release of the pushing force, under the urging force of the urging member, the card will be pushed back together with the slide member, thus being discharged. With such push-push mechanism, the card can be attached/detached in an easy and safe manner.

PRIOR ART DOCUMENT

Patent Document

[Patent Document 1] Japanese Unexamined Patent Application Publication No. 2008-84623

SUMMARY OF THE INVENTION

Problem to be Solved by Invention

With the card connector described in Patent Document 1, a card recognizing switch for detecting the card is comprised of two plate springs provided at the deep portion in the body. In operation, when the card is pushed in to the deep portion inside the body, the two plate springs come into contact with each other, so that the switch is turned ON, thus detecting insertion of the card.

Since the card recognizing switch described above is turned ON in midway of the pushed-in displacement of the card, the ON-state of the switch is constantly maintained during the process from the pushing-back of the card by the urging member to its arrival at the appropriate position. If the card while being kept under the switch-ON state is moved, there is the possibility of occurrence of chattering or bounce due to friction between a contact provided in the card connector and the contact pad of the card. To avoid the problem resulting therefrom, it is needed to load a program for processing chattering/bounce in the card connector. Hence, this can be a cause of inviting program complexity.

The present invention has been made in view of the above-described state of the art. The principal object of the invention is to provide a push-push type card connector capable of detecting a card with activation of a switch mechanism in response to attachment of the card at an appropriate position, the improved connector not requiring any program for processing chattering or bounce.

Means to Solve Problem

According to a first characterizing feature of a card connector relating to the present invention, the card connector comprises:

a slide member disposed on one lateral side inside a body having a space for allowing insertion of a card, the slide member coming into engagement with the card when the card is inserted, the slide member being movable along an inserting/withdrawing direction of the card;

an urging member for urging the slide member toward a card insertion opening;

a pin member having a slide end that is slidable within a cam groove formed in the slide member relative thereto and a support shaft end that is supported to the body;

wherein when the card is pushed in to the deepest position inside the body and then released from this pushing, the slide member is pushed back by the urging member and the slide end is retained at a lock portion formed in the cam groove, whereby the card is maintained at an appropriate position;

wherein, when the card is pushed in again away from the appropriate position and then released from this pushing, the slide end is released from the lock portion and the slide member is pushed back by the urging member, whereby the card is discharged from the body; and a switch mechanism that is activated by the support shaft end when the slide end is pushed by the slide member in the urging direction of the urging member while the slide end is retained at the lock portion.

With the first characterizing feature described above, in the so-called push-push type card connector, the switch mechanism is activated only after the card has reached the appropriate position. The card is not detected in the course of its insertion, but detected only after its arrival at the appropriate position. Therefore, there is no need for the program for processing chattering/bounce which was required by the conventional card connector. Moreover, with the inventive construction above, since the pin member inherently provided in the push-push type card connector is utilized for the activation of the switch mechanism, there is no need for significant design change in the card connector.

According to a second characterizing feature of the present invention, the switch mechanism includes a pivotal member pivotable in association with movement of the support shaft end and a switch fixed to the body, the switch being turned ON in response to a depressing operation of a button thereof at the time of pivotal movement of the pivotal member.

With the second characterizing feature described above, through appropriate adjustment of the shape of the pivotal member and/or the pivot of the pivotal movement, it becomes possible to secure a large amount of movement for the portion adapted for pushing the switch even when the amount of the movement of the support shaft end is small. Consequently, the switch can be rendered into the ON state in a reliable manner.

According to a third characterizing feature of the present invention, the switch mechanism includes a relay member slidable in association with movement of the support shaft end and a switch fixed to the body, the switch being turned ON in response to a depressing operation of a button thereof when the relay member is slid.

With the third characterizing feature described above, various kinds of switch can be used, depending on the shape and the sliding direction of the relay member employed. Thus, this feature provides greater degree of freedom in the choice of the switch.

According to a fourth characterizing feature of the present invention, the switch mechanism includes a plate spring which is depressed by movement of the support shaft end and a metal contact element fixed to the body, the metal contact element coming into contact with the plate spring when the plate spring is depressed.

With the fourth characterizing feature described above, the construction is simple without any member being present between the support shaft end and the plate spring. So, it is possible to reduce the costs and the number of assembly steps. Moreover, it can be expected also that occurrence of trouble in the switch mechanism will be reduced.

MODES OF EMBODYING THE INVENTION

First Embodiment

Figure 1:
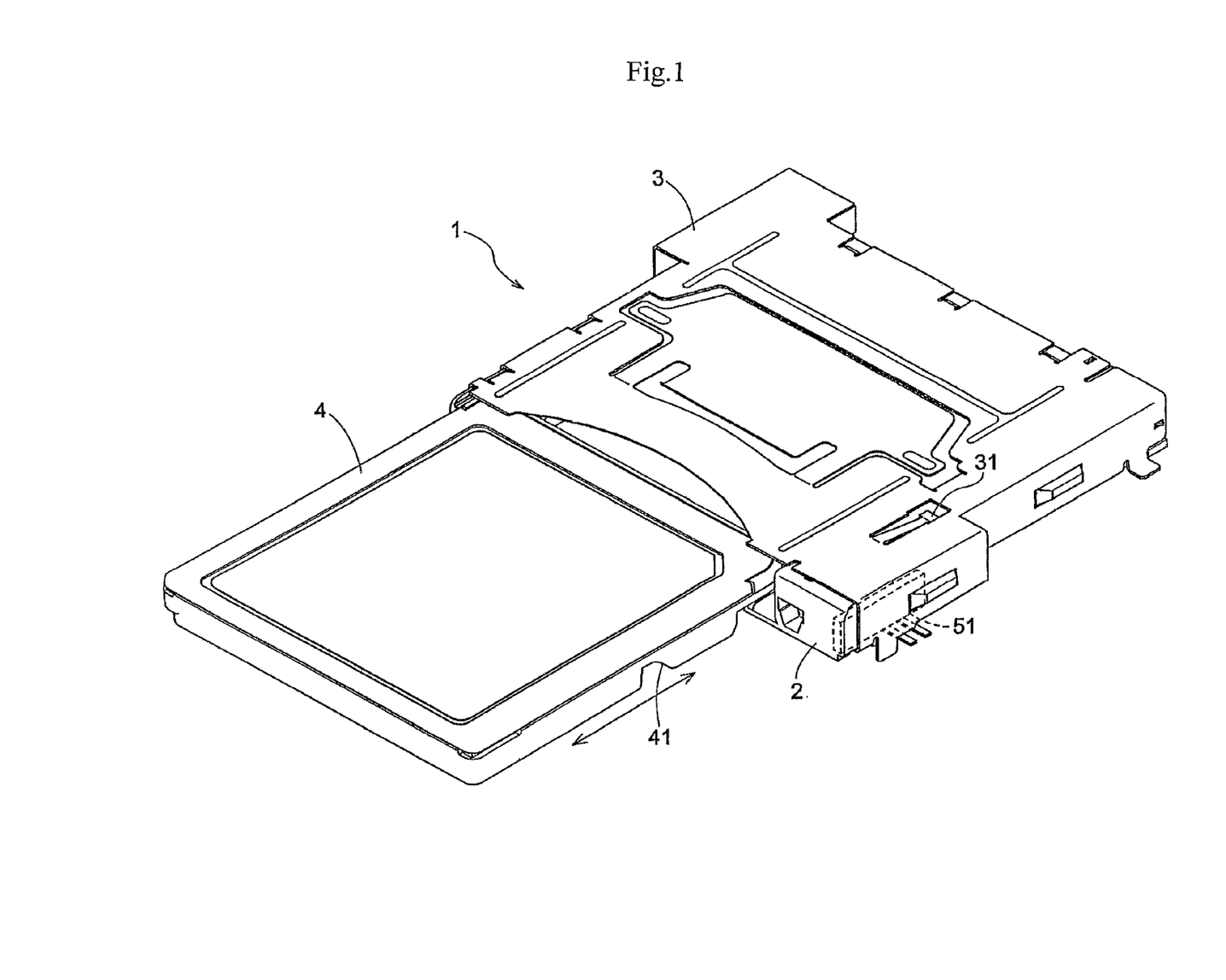
FIG. 1 is a general perspective view of a card connector relating to a first embodiment.
Figure 2:
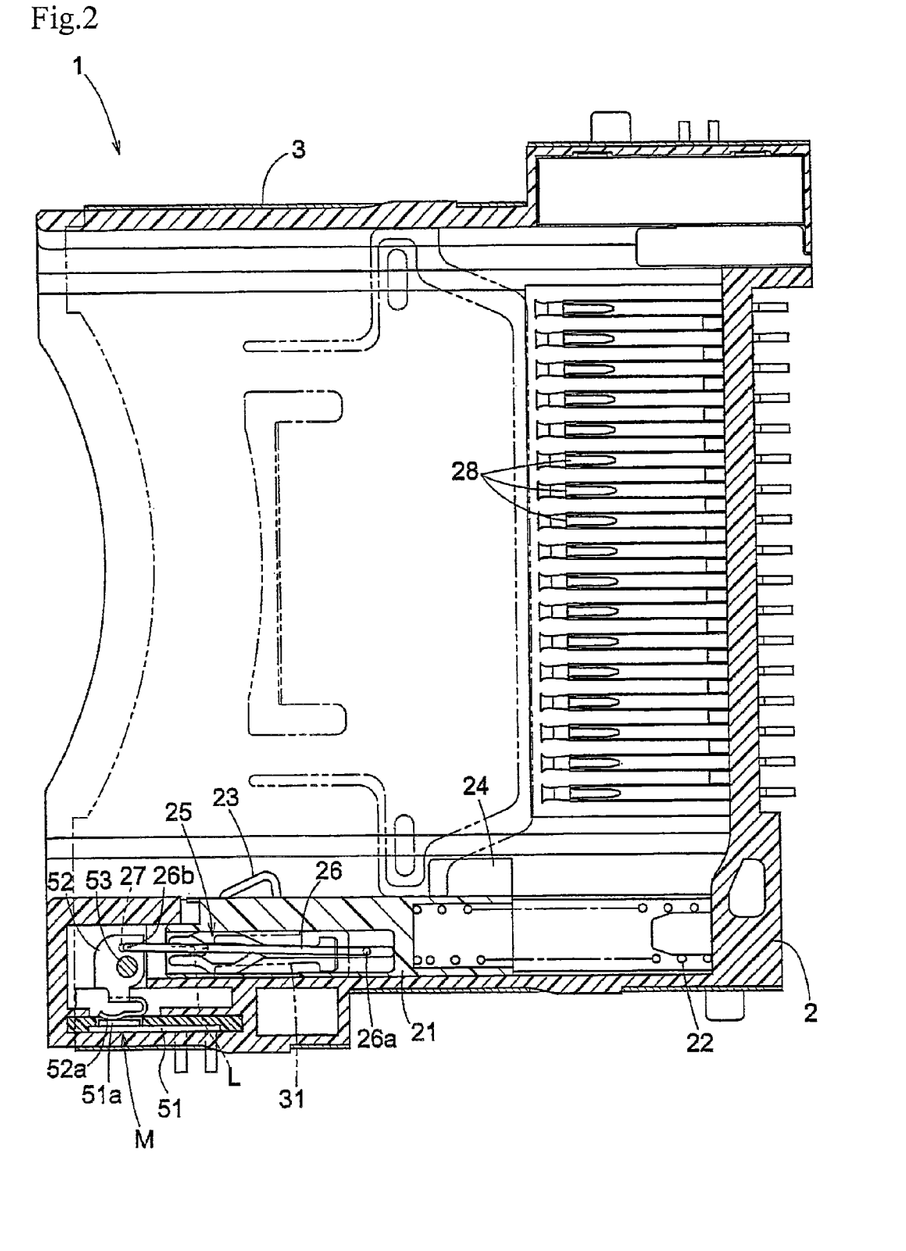
FIG. 2 is an inner plan view showing the card connector relating to the first embodiment, FIG. 3 are a plane view (a) and a section view (b) both showing in greater details a switch mechanism relating to the first embodiment.
Figure 3:
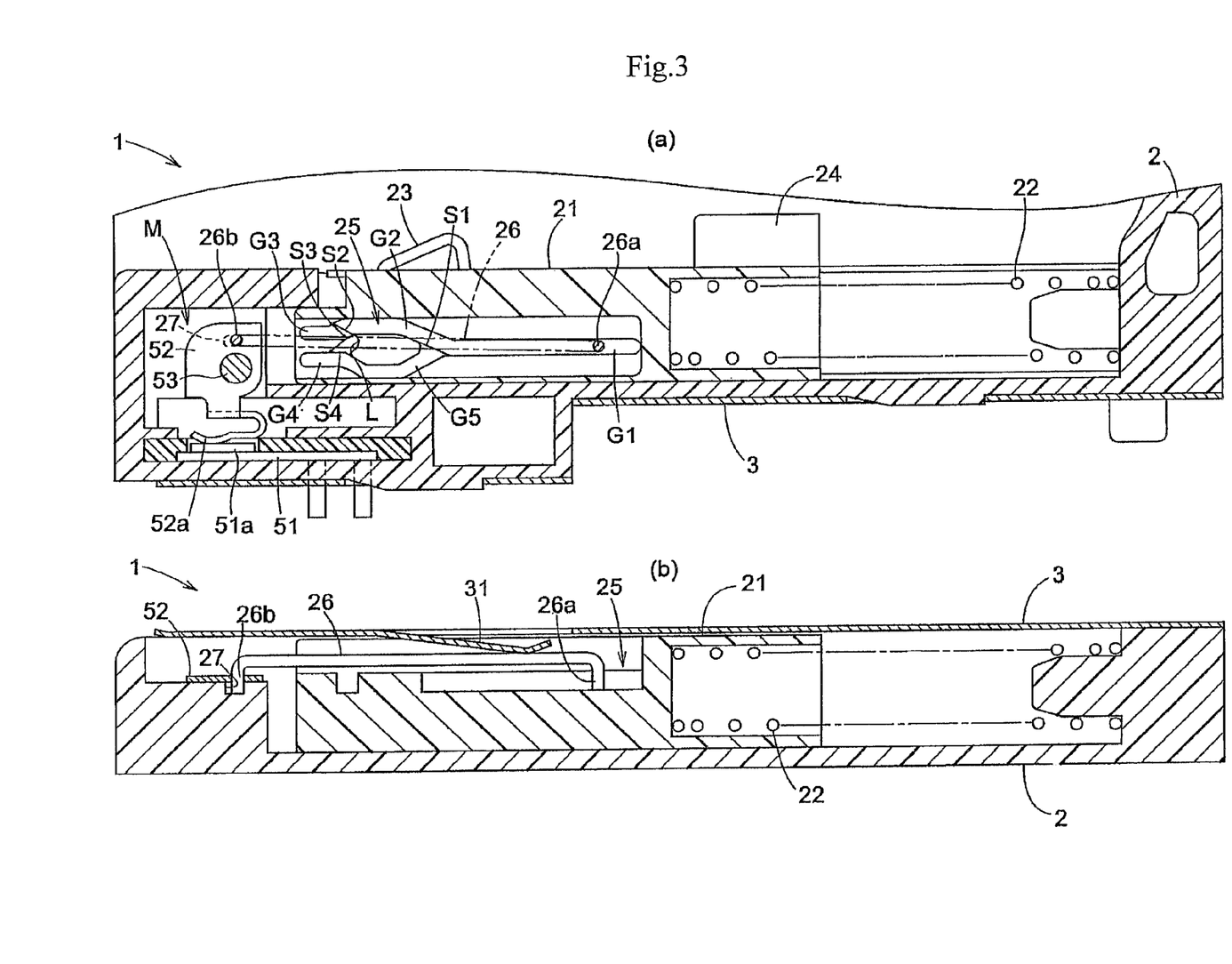
Figure 4:
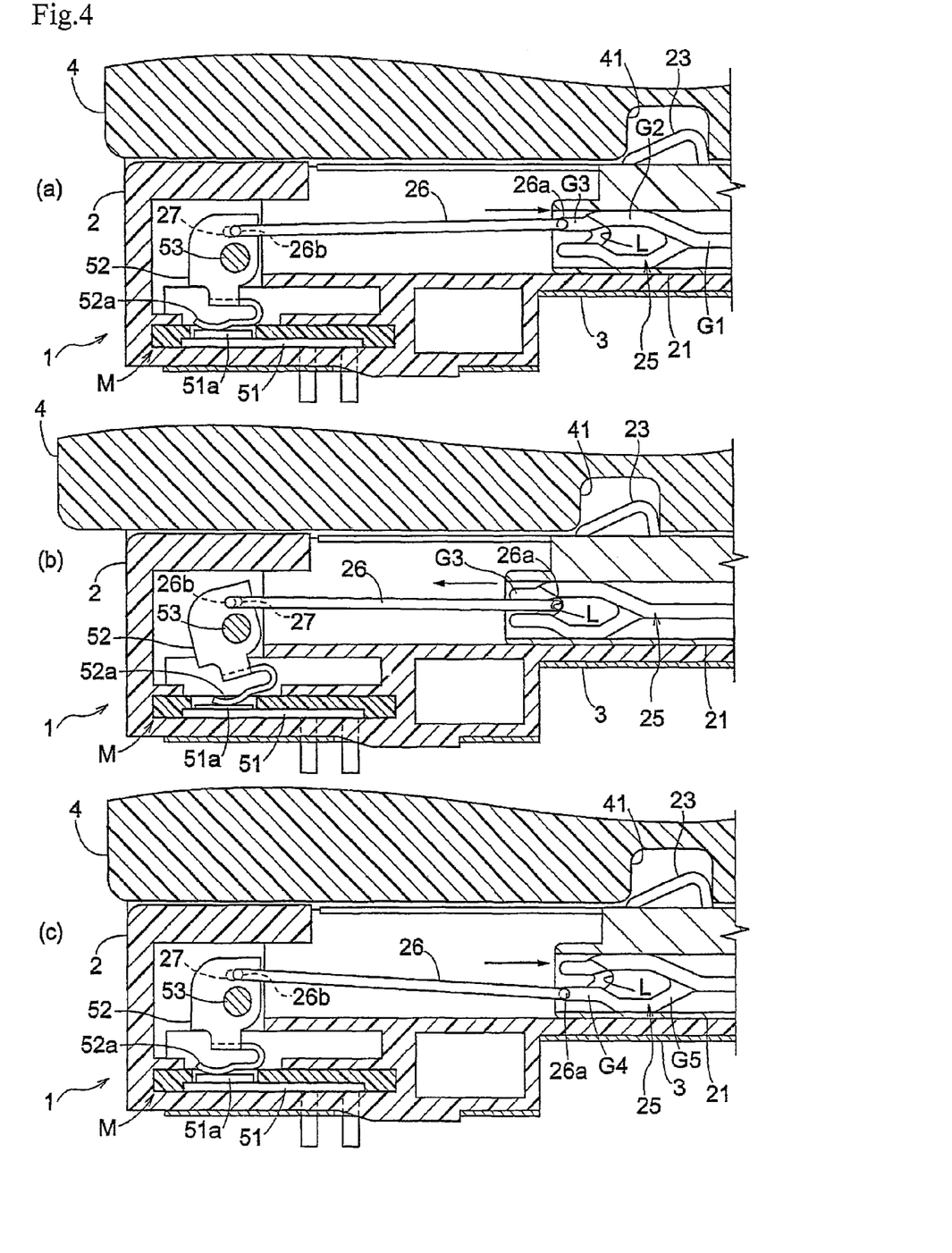
FIG. 4 is a plane view showing operational states of the switch mechanism relating to the first embodiment.

Next, a first embodiment of a card connector relating to the present invention will be described with reference to FIGS. 1-4. FIG. 1 is a plane view showing a general construction of a card connector 1. FIG. 2 is a plane view showing the inside of the card connector 1. FIG. 3 are a plane view (a) and a section view (b) both showing in greater details a switch mechanism M and a slide member 21. FIG. 4 are plane views showing operational states of the switch mechanism M, (a) showing a card pushed-in state, (b) showing a card locked state and (c) showing a card re-pushed in state, respectively.

The card connector 1 consists essentially of a body 2 and a cover 3, and a card 4 is inserted into an inner space formed when the cover 3 is attached to the body 2. The slide member 21 is disposed to be movable along the inner wall surface of the body 2 along the inserting/withdrawing direction of the card 4 and this slide member 21 is constantly urged by an urging member 22 toward a card insertion opening. The slide member 21 includes an engaging member 22 and a projecting portion 24 and further includes a heart-shaped cam groove 25. At the time of insertion of the card 4, the engaging member 23 comes into engagement with a cutout portion 41 formed in a lateral face of the card 4 and also the leading end of the card 4 comes into contact with the projecting portion 24, thus rendering the slide member 21 being movable together with the card 4. The construction of the cam groove 25 will be detailed later.

A pin member 26 has a one-side opened rectangular shape, with one terminal end thereof being configured to function as a slide end 26a slidable within the cam groove 25 in association with movement of the slide member 21 and relative thereto, the other terminal end thereof being configured to function as a support shaft end 26b to be inserted into an engaging hole 27 formed in the body 2. The engaging hole 27 has an oval shape to allow movement of the support shaft end 26b along the urging direction of the urging member 22. Further, the support shaft end 26b is operably coupled to a pivotal member 52 pivotally mounted to the body 2 via a shaft member 53. Under the assembled condition of the card connector 1, a tongue-shaped elastic portion 31 formed in the cover 3 constantly presses the pin member 26 against the bottom face of the body 2, thereby to prevent inadvertent detachment of the opposed ends of the pin member 26 from the cam groove 25 and the engaging hole 27.

A contact 28 is a metal element which is provided at a deep position inside the body 2 on the side opposite to and away from the card insertion opening. Upon establishment of contact between an electrode (not shown) provided on the back face of the card 4 and the contact 28, electric conduction is enabled between the card connector 1 and the card 4. Under this condition, if the switch 51 is turned ON, reading data from the card 4 etc. becomes possible.

The cam groove 25 consists of a standby lane G1, an insertion lane G2, an introduction lane G3, a detachment lane G4, a discharge lane G5 and a lock portion L. Absent insertion of the card 4, the slide end 26a is positioned at the standby lane G1 (FIG. 3).

Upon insertion of the card 4, engagement is established between the engaging member 23 and the cutout portion 41 formed in the lateral portion of the card 4 and also contact is established between the leading end of the card 4 and the projecting portion 24. If the card 4 is pushed in under this condition, the slide member 21 together with the card 4 will be slid deep into the body 2. When the card 4 is pushed to the deepest portion of the body 2, the slide end 26a will move from the standby lane G1 through the insertion lane G2 and eventually reach the end point of the insertion lane G2 (the start point of the introduction lane G3) (FIG. 4 (a)).

Upon release of this pushing-in force to the card 4, the slide member 21 will be pushed back toward the card insertion opening by the urging member 22. In the course of this, the slide end 26a will be guided by the insertion lane G3 and then retained at the locking portion L, whereby the slide member 21 will be locked together with the card 4 (FIG. 4 (b)). In the following discussion, the position of the card 4 under this card locked condition will be referred to as the "appropriate position" of the card 4.

When the card 4 is pushed in again from the appropriate position, the slide end 26a will be detached from the locking portion L and then moved to the end point of the detachment lane G4 (the start point of the discharge lane G5) (FIG. 4 (c)).

Upon release of this pushing-in force to the card 4, the slide member 21 will be pushed back by the urging member 22, so that the slide end 26a will be returned to the standby lane G1 through the discharge lane G5 and the card 4 will be discharged. In the course of this, since the cutout portion 41 of the card 4 is in engagement with the engaging member 23, there will occur no jumping detachment of the card 4 out of the card connector 1. When the card 4 is pulled, the above engagement will be released, so that withdrawal of the card 4 becomes possible.

In order to allow the above-described series of movements of the slide end 26a to proceed in a reliable and smooth manner, the cam groove 25 is provided with appropriate steps. Namely, adjacent the border between the standby lane G1 and the discharge lane G5, there is formed a step S1 which is formed deeper on the side of the standby lane G1, so as to prevent invasion of the slide end 26a from the standby lane G1 into the discharge lane G5. Further, there is formed a step S2 which is formed deeper on the side of the introduction lane G3 relative to the insertion lane G2, so as to prevent backset of the slide end 26a to the insertion lane G2 from the introduction lane G3. Similarly, there formed a step S3 which is formed deeper on the side of the locking portion L relative to the introduction lane G3 and a step S4 which is formed deeper on the side of the detachment lane G4 relative to the locking portion L, so as to prevent backset of the slide end 26a, respectively.

Next, with reference to FIG. 4, there will be described operations of the switch mechanism M for recognizing that the card 4 has been attached to the appropriate position. The switch mechanism M of this embodiment consists essentially of the switch 51 and a pivotal member 52. The switch 51 includes a button 51a and maintains its OFF state unless a depressing force is applied to the button 51a. The pivotal member 52 includes an arm 52a. Normally, this arm 52a does not depress the button 51a; whereas, the arm 52a does depress the button 51a when the pivotal member 52 is pivoted (FIG. 4 (a), (c)).

At the time of the card locked state shown in FIG. 4 (b), that is, when the card 4 has reached the appropriate position, the slide end 26a of the pin member 26 is retained at the locking portion L. In this, since the slide member 21 is placed under the urging force of the urging member 22, the slide end 26a is subjected to a force toward the card insertion opening. As a result, the support shaft end 26b as the other end of the pin member 26, will move within the oval-shaped engaging hole 27, toward the card insertion opening. In response to this movement of the support shaft end 26b, the pivotal member 52 will be pivoted and the arm 52a will depress the button 51a, whereby the switch mechanism M will be activated.

Since the switch mechanism M is activated only after and when the card 4 has reached the appropriate position, a program for processing chattering and/or bounce will be no longer needed. Further, if the position adjustment of the shaft member 53 acting as the pivot for the pivotal movement of the pivotal member 52 and the choice of the shapes of the pivotal member 52 and/or the arm 52a are done appropriately, it becomes possible for the arm 52a to obtain a large amount of movement relative to the amount of movement of the support shaft end 26b, so that button 51a can be depressed even more reliably.

Second Embodiment

Figure 5:
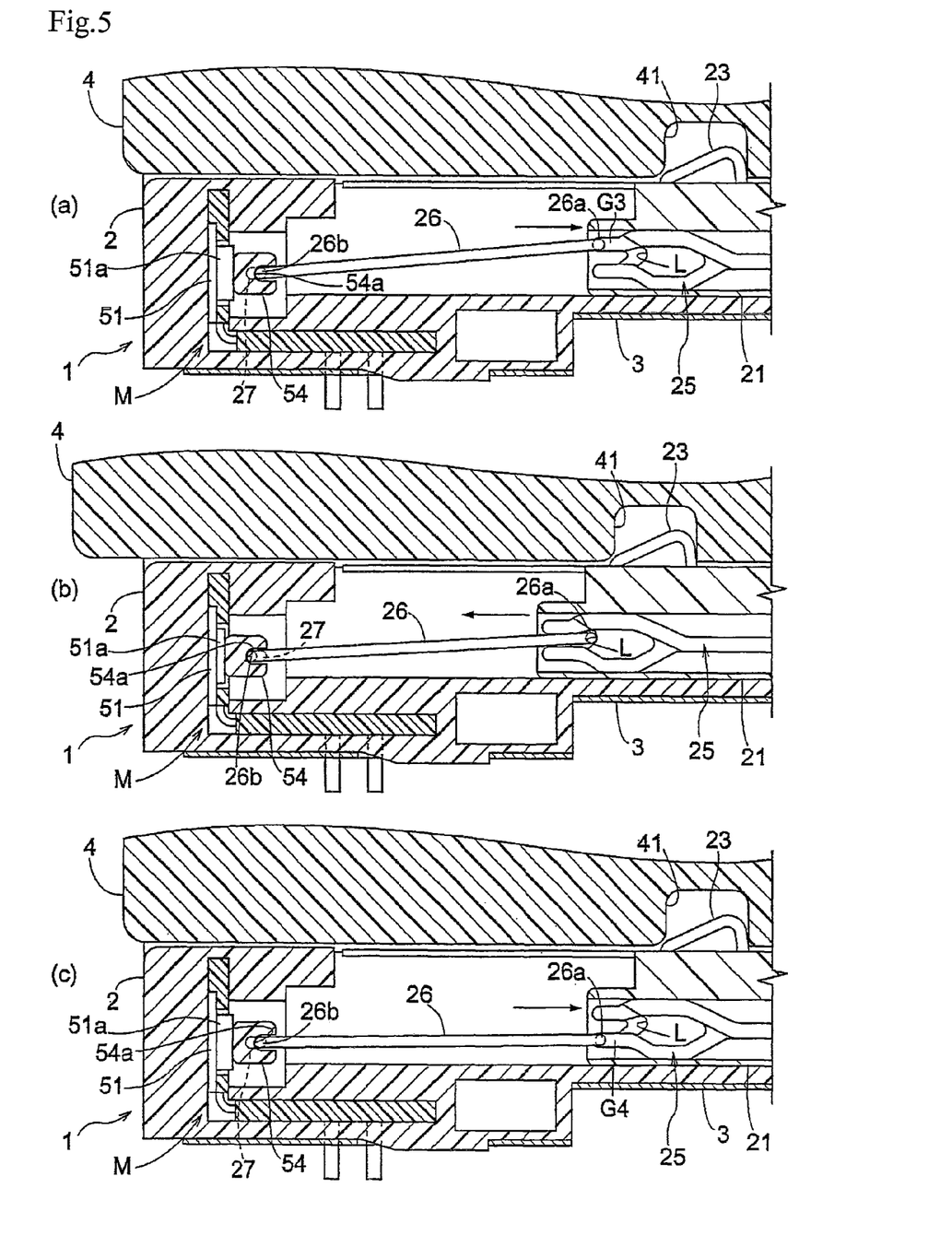
FIG. 5 is a plane view showing operational states of a switch mechanism relating to a second embodiment.

Next, a second embodiment of the present invention will be described with reference to FIG. 5 showing various operational state of the switch mechanism M, with (a) showing the card pushed-in state, (b) showing the card locked state, (c) showing the card re-pushed in state, respectively. This embodiment is identical to the first embodiment, except for the switch mechanism M. Therefore, explanation except for that of the switch mechanism M will be omitted below.

The switch mechanism M of this embodiment consists essentially of the switch 51 and a relay member 54. The relay member 54 defines a recess 54a and the support shaft end 26b is positioned to be able to contact the bottom of this recess 54a. The switch 51 includes the button 51a, so that the switch 51 maintains its OFF state unless a depressing force is applied to the button 51a. Normally, the relay member 54 does not depress the button 51a, but depresses it when the relay member 54 is slid.

As described above in the first embodiment, when the card 4 reaches the appropriate position, the support shaft end 26b is moved within the engaging hole 27 toward the card insertion opening. In the course of this, the support shaft end 26b depresses the relay member 54 toward the card insertion opening, as a result of which the button 51a is depressed, thereby to activate the switch mechanism M (FIG. 5 (b)). Unless the card is located at the appropriate position, the relay member 54 will not be slid and the switch mechanism M will remain un-activated (FIG. 5 (a), (c)).

In this way, since the switch mechanism M is activated only when and after the card 4 has reached the appropriate position, there is no need for a program for processing chattering and/our bounce. Incidentally, in the present embodiment, the relay member 54 is slid toward the card insertion opening. Instead of this arrangement, it is also possible to employ a further arrangement where the relay member 54 is slid in a different direction to turn ON the switch 51.

Third Embodiment

Figure 6:
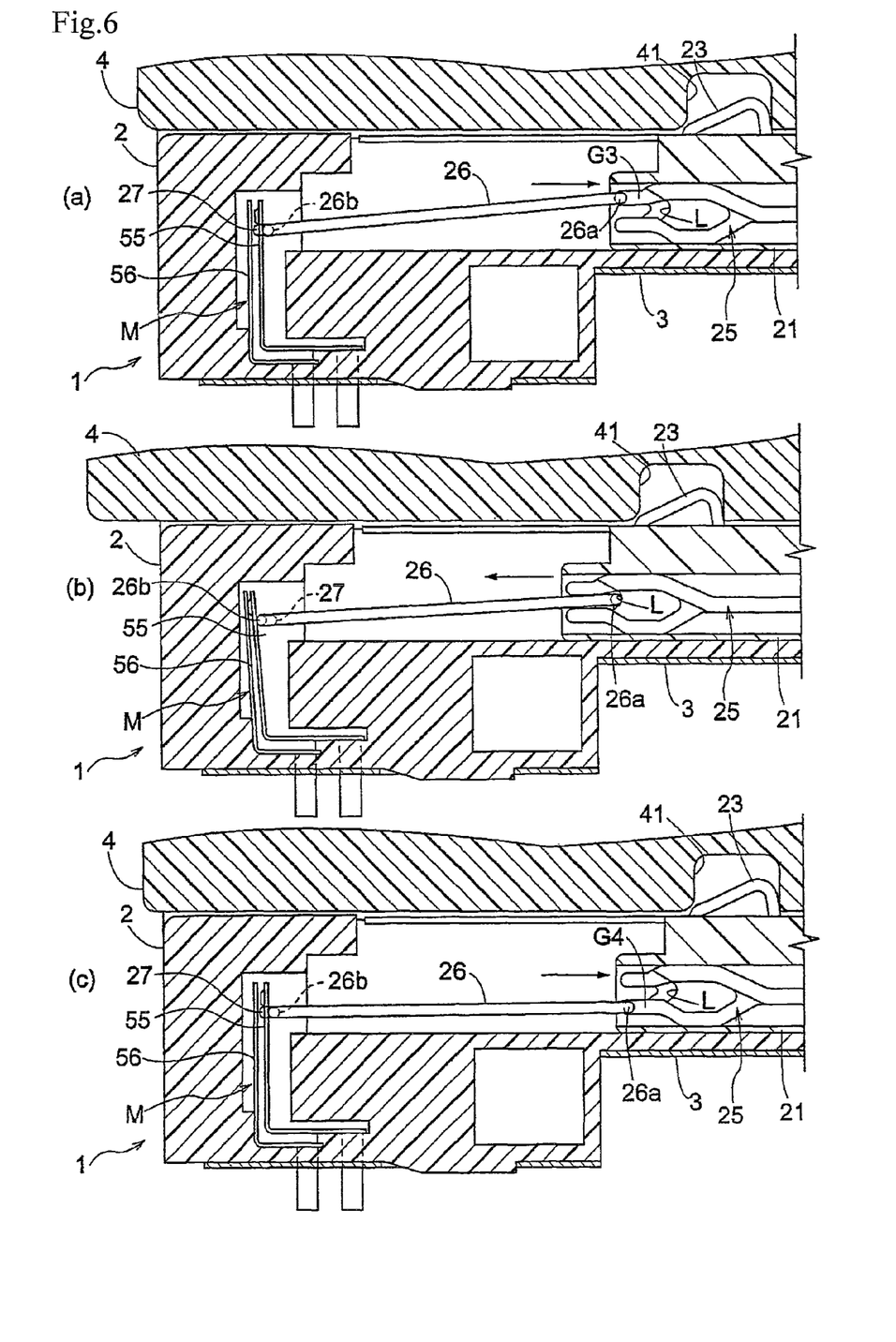
FIG. 6 is a plane view showing operational states of a switch mechanism relating to a third embodiment.

A third embodiment of the present invention will be described with reference to FIG. 6 showing various operational state of the switch mechanism M, with (a) showing the card pushed-in state, (b) showing the card locked state, (c) showing the card re-pushed in state, respectively. This embodiment is identical to the first embodiment, except for the switch mechanism M. Therefore, explanation except for that of the switch mechanism M will be omitted below.

The switch mechanism M used in this embodiment consists of two plate springs 56, 56 both of which are metal pieces. Normally, the support shaft end 26b is merely located adjacent the leading end of the plate spring 55, not depressing this plate spring 55. Hence, the plate spring 55 and the plate spring 56 are kept under non-contact condition.

As described above in the first embodiment, when the card 4 reaches the appropriate position, the support shaft end 26b is moved within the engaging hole 27 toward the card insertion opening. In the course of this, the support shaft end 26b depresses the plate spring 55, whereby the plate springs 55 and 56 come into contact with each other (FIG. 6 (b)). With this contact, the switch mechanism M is rendered into electrically conductive state. Unless the card is located at the appropriate position, the plate springs 55 and 56 do not come into contact, thus, the switch mechanism M will remain un-activated (FIG. 6 (a), (c)).

In this way, since the switch mechanism M is activated only when and after the card 4 has reached the appropriate position, there is no need for a program for processing chattering and/our bounce. Also, since the switch mechanism M has the simple construction consisting of only the plate springs, it is possible to reduce the costs and the number of assembly steps. And, this construction is less liable to fail. Incidentally, instead of the plate spring 56, a metal contact piece may be employed that is completely fixed to the box 2 so that no movement or deformation occurs therein.

INDUSTRIAL APPLICABILITY

There is provided a push-push type card connector capable of detecting a card with activation of a switch mechanism in response to attachment of the card at an appropriate position, the improved connector not requiring any program for processing chattering or bounce.

DESCRIPTION OF REFERENCE MARKS AND NUMERALS 1. card connector
2. body
4. card 21. slide member
22. urging member
25. cam groove
26. pin member
26a. slide end
26b. support shaft end
27. engaging hole
51. switch (switch mechanism)
52. pivotal member (switch mechanism)
54. relay member (switch mechanism)
55, 56. plate springs (switch mechanism)
L. locking portion
M. switch mechanism

The invention claimed is:

1. A card connector comprising:
a slide member disposed on one lateral side inside a body having a space for allowing insertion of a card, the slide member coming into engagement with the card when the card is inserted, the slide member being movable along an inserting/withdrawing direction of the card;
an urging member for urging the slide member toward a card insertion opening;
a pin member having a slide end that is slidable within a cam groove formed in the slide member relative thereto and a support shaft end that is supported to the body;
wherein when the card is pushed in to the deepest position inside the body and then released from this pushing, the slide member is pushed back by the urging member and the slide end is retained at a lock portion formed in the cam groove, whereby the card is maintained at an appropriate position;
wherein, when the card is pushed in again away from the appropriate position and then released from this pushing, the slide end is released from the lock portion and the slide member is pushed back by the urging member, whereby the card is discharged from the body; and
a switch mechanism that is activated by the support shaft end when the slide end is pushed by the slide member in the urging direction of the urging member while the slide end is retained at the lock portion.

2. The card connector according to claim 1, the switch mechanism includes a pivotal member pivotable in association with movement of the support shaft end and a switch fixed to the body, the switch being turned ON in response to a depressing operation of a button thereof at the time of pivotal movement of the pivotal member.

3. The card connector according to claim 1, wherein the switch mechanism includes a relay member slidable in association with movement of the support shaft end and a switch fixed to the body, the switch being turned ON in response to a depressing operation of a button thereof when the relay member is slid.

4. The card connector according to claim 1, wherein the switch mechanism includes a plate spring which is depressed by movement of the support shaft end and a metal contact element fixed to the body, the metal contact element coming into contact with the plate spring when the plate spring is depressed.

* * * * *